(12) United States Patent
Shevlin et al.

(10) Patent No.: US 7,818,201 B2
(45) Date of Patent: Oct. 19, 2010

(54) LEAD REFERRAL SYSTEM

(75) Inventors: Barry Shevlin, Palm Harbor, FL (US); Mark Hembree, Tampa, FL (US); Tom Canalungo, Oldsmar, FL (US); Joe Gonzales, Oldsmar, FL (US); John Stafford, Santa Barbara, CA (US)

(73) Assignee: Vology, Inc., Oldsmar, FL (US)

( * ) Notice: Subject to any disclaimer, the term of this patent is extended or adjusted under 35 U.S.C. 154(b) by 1178 days.

(21) Appl. No.: 11/395,503

(22) Filed: Mar. 31, 2006

(65) Prior Publication Data

US 2007/0233780 A1 Oct. 4, 2007

(51) Int. Cl.
G06F 17/00 (2006.01)
(52) U.S. Cl. .......................................... 705/10
(58) Field of Classification Search ....................... 705/10
See application file for complete search history.

(56) References Cited

U.S. PATENT DOCUMENTS

| | | | |
|---|---|---|---|
| 6,101,486 | A | 8/2000 | Roberts et al. |
| 6,804,701 | B2 | 10/2004 | Muret et al. |
| 2001/0011275 | A1 | 8/2001 | Lin et al. |
| 2002/0091736 | A1 | 7/2002 | Wall |
| 2002/0161629 | A1 | 10/2002 | Jentoft |
| 2003/0005046 | A1 | 1/2003 | Kavanaugh et al. |
| 2003/0078788 | A1 | 4/2003 | Sussman et al. |
| 2003/0128231 | A1 | 7/2003 | Kasriel et al. |
| 2003/0130982 | A1 | 7/2003 | Kasriel et al. |
| 2004/0070606 | A1 | 4/2004 | Yang et al. |
| 2004/0073644 | A1 | 4/2004 | Koch et al. |
| 2004/0143473 | A1 | 7/2004 | Tivey et al. |
| 2004/0143476 | A1 | 7/2004 | Kapadia et al. |
| 2004/0225687 | A1 | 11/2004 | Larsson et al. |
| 2005/0108041 | A1 | 5/2005 | White |
| 2005/0165889 | A1 | 7/2005 | Muret et al. |
| 2005/0228704 | A1 | 10/2005 | Fishman et al. |
| 2006/0064340 | A1 | 3/2006 | Cook |
| 2006/0116896 | A1 | 6/2006 | Fowler et al. |
| 2006/0184640 | A1 | 8/2006 | Hatch |

OTHER PUBLICATIONS

No author; Leading Customers to You; Jun. 1, 1995; VARbusiness, p. 34; dialog copy.*
International Search Report from the International Searching Authority/US dated Dec. 20, 2007 for International Application No. PCT/US07/65672, 2 pages.

* cited by examiner

*Primary Examiner*—Thomas Dixon
(74) *Attorney, Agent, or Firm*—Christopher Paradies; Fowler White Boggs P.A.

(57) ABSTRACT

A system for processing lead referrals is capable of assigning leads by product line, language and/or availability of the representative. The system is also capable of high lead referral throughput using steps such as filtering repeat visitors to a company from new leads, non-corporate leads from corporate leads, and avoiding requests for information to external databases during black-out times, such as set by registrars.

28 Claims, 2 Drawing Sheets

LEAD REFERRAL SYSTEM

FIELD OF THE INVENTION

The field relates to a lead referral system.

BACKGROUND

It is known for a company to advertise or display its products and services on web pages of an internet website. Internet users who visit the company's website may be interested in purchasing or obtaining information about the company's products and services. An internet user's visit to the company's website is anonymous, unless the company takes measures to track a visitor's access to its website. There are contact management systems that are used for lead referrals. The problem with contact management systems is that the rate of contacts to a website is far too rapid for any contact management system that requires manual research prior to referring a contact to or lead to a company representative.

U.S. Pat. Publ. No. 2004/0225687A1 involves a system for identifying visitors to a website. This patent publication teaches a system for identifying a visitor to a website by cross-referencing the visitor's network address against a database to determine the organization with which the visitor is associated. However, this publication fails to disclose a system that is capable of referring leads to representatives by product line, and fails to disclose a system to handle high throughput lead generation.

U.S. Pat. Publ. No. 2004/0143473A1 involves a system for assigning a sales lead to a representative. This patent publication teaches a system for assigning insurance leads to an insurance account representative based upon the territory and employer. This publication does not disclose a system capable of referring leads to representatives by product line and it also fails to disclose a system that handles high throughput lead generation.

Various aspects of the system of the invention are described herein using terms related to the internet environment. For instance, "IP address" is an identifier for a computer on a network. "Domain name" is a name that identifies one or more IP addresses. "DNS" is an abbreviation for Domain Name System, which is an internet service that translates a domain name into an IP address. A "reverse DNS" is an internet service that translates an IP address into a domain name. "WHOIS" is an internet service that returns ownership information about a domain name or IP address. WHOIS databases are maintained by the registrars of domain names. "ISP" is an abbreviation for Internet Service Provider, which is a company that provides access to the internet. "URL" is an abbreviation for the Uniform Resource Locator, which is the address of web pages or documents on the internet. When a URL is generated by a search engine, it may contain one or more keywords or phrases entered by a person or machine in the search string of the search engine.

SUMMARY OF INVENTION

A lead referral system refers leads to a company representative. The referral system uses the network address to assign the lead to an appropriate representative, such as a representative having experience in a specific product line, as determined using keywords supplied to a search engine and/or tracking web pages viewed by the visitor. A lead referral system of the present invention may automatically identify a visitor to a website and assign a lead to a representative. One or more product lines may be associated with a visitor. The product line information may be used in assigning the lead to a representative who is experienced with the product lines of interest to the lead. Matching the lead with a representative who is experienced with the product line of interest is advantageous for making sales compared to assigning a lead without reference to a specific product line or the knowledge of the representative.

The representative of the company may be provided with a contact name and/or a telephone number based on information in a database. The database may be a local database maintained by the company or may be a third party database accessed by the company, such as a registrar database allowing access to contact information based on a domain name search.

It may be determined if the user is a first-time visitor to the website or a returning visitor to the website. If the user is a returning visitor, then a representative may be selected, based on previous contact with the user.

It has been discovered that registrars prevent repeated searches of their database from any specific server for a specific period of time. An error or hanged process is caused by too frequent access to a registrar by a server, slowing the data retrival process from this third party database. If the database is a registrar database, then rules may be applied to avoid recontacting the same registrar database during the specific period of time that the registrar has set for blocking access by the same server. Instead, another server may access the registrar database or the same server may instead contact a different registrar database for a different lead. Thus, the rules may improve or optimize the process of retrieving information from various registrar databases, such that information is retrieved according to a schedule from the various registrar databases, increasing the number of leads that may be processed by a server. A database may have black-out periods associated with each registrar.

The historical efficiency of each of the representatives may be used to determine the number of leads to be sent to each of the representatives. In one example, the historical efficiency is used in the calculation of bonuses provided to representatives of the company. The term representative is used in its most general sense, such as an employee of the company or an independent contractor. In one example, the leads are assigned based on a number of leads already assigned.

One advantage is that a representative may be selected who has the technical and/or marketing information necessary for assisting the user with a purchase of a product from the specific product line or lines. Another advantage is that the number of leads may be distributed among available representatives with the appropriate experience.

Another advantage is the ability to handle high volumes of potential leads by separating repeat visitors from first-time visitors and by scheduling queries to databases for new users according to a set of rules that prevent reaccessing of databases during black-out periods. This permits a high volume of leads to be generated, such as a volume of leads up to about 20 per minute for each server used to query registrar databases. The black-out times may be periodically reviewed and updated if registrar databases update their black-out times.

BRIEF DESCRIPTION OF THE DRAWING

The drawings illustrate examples of the present invention.

DETAILED DESCRIPTION

Figure 1:
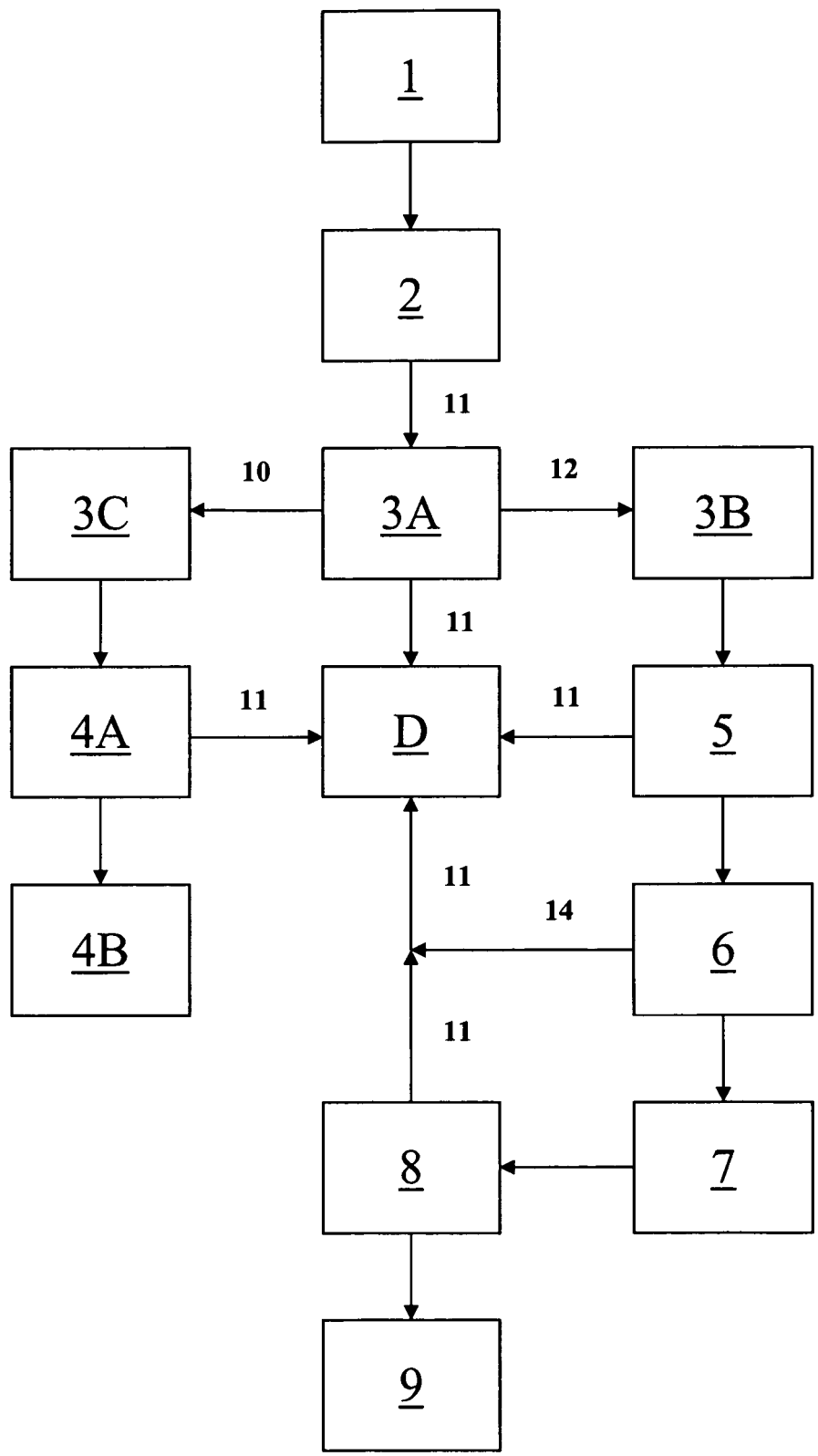
FIG. 1 illustrates an example of a system flow diagram of the present invention.

Examples of the present invention will now be described in detail for specific embodiments of the invention. These embodiments are intended merely as illustrative examples. The invention is not to be limited to these specific examples, but only by the language of the claims themselves.

A lead referral system provides for automated assignment of a lead to a representative, such as by product line associated with the lead. In one example, a visit to a web page is initiated using an internet search engine. Certain information is passed to the web server hosting the web page from the search engine. This information may include the network address of the visitor and keywords used in the search. The product line associated with the visitor may be identified from a keyword or phrase in the referring search engine's URL and/or information about the web page or pages accessed during the visit. Information about the visitor may be obtained from a local database or an external database, such as a reverse DNS lookup database and/or a database of a registrar for a domain name. The information may include company name, address, phone number and one or more contact names.

For example, an internet user using a computer enters a product line identifier keyword into the search prompt of an internet search engine. On the user's screen, the computer displays a list of web page links associated with the keyword. The user selects one of the links. By selecting the link, the user of the search engine is directed to a web page that is hosted by a server. If the server is using a lead referral system, then a lead may be generated to a representative.

Other search terms may have been listed in the search engine that identify a specific product or product line, such as a product line sold by Cisco[1]. The product line identifier may be determined from the search string in the URL. For example, the system parses the product line "Cisco" from the URL. This information may be stored in a local database for future reference by a representative.

[1] Cisco® is a registered trademark of Cisco Technology, Inc.

The visitor's access to the web page also brings with it identifying information, such as the visitor's network address, such as an IP address of 67.129.183.2. The system may check the network address against a database, such as a local database or a networked database, to determine whether the visitor is a repeat visitor to the company or a first-time visitor. If the visitor is a repeat visitor, then the system may update the database and notify a representative who has already contacted the lead that the visitor has returned to view the same or additional web pages. In one example, an element or flag is recorded, if the visitor should not be contacted. If there is no indication of a do not contact element then the system may select the same representative that was previously selected for the lead, if possible, for follow up with the lead.

If a check of the database has no record of the visitor's network address, then information about the lead may be added to the database. The system may determine the domain name associated with the network address, such as by a reverse DNS lookup. The domain name may be compared to the database to determine if the domain name is in the database. If not, then information may be obtained from another database, such as a database of a registrar of the domain name. If the domain name or information about visitor indicates that the visitor is a repeat visitor, then the process may proceed as described previously. If not a repeat visitor, then the information and/or domain name may be added to a database, such as a local or networked database.

In one example, the system determines the geographic language region of a visitor based on the country or region derived from contact information. Also, the system may use the contact information or domain name to create a URL data string for accessing the visitor's website, if the representative requires information from the website. An automated routine may automatically search the website for information pertinent to the product line, for example.

In one example, the system may select a representative who has experience with the product line associated with the visitor. A system may also select a representative based on language skills based on the geographic language region.

In one system, a representative for a first-time visitor is selected from a pool of representatives based on three selection criteria: 1) the representative's experience with the product line, 2) the representative's language skills, and 3) the number of pending leads currently assigned to the representative. For example, a local database may be checked to determine the skills and availability of a representative. This database may assign a maximum number of leads for each representative or by product line, such as shown in Table I. The system of this example matches the product line associated with the visitor to a list of representatives having experience with the product line. Then, the system matches the visitor's geographic language region to further limit the list of representatives having the appropriate language skills. Finally, the system will find an available representative, such as by assigning to an available agent with the fewest pending leads currently assigned, unless the lead would exceed the maximum limit set for that representative. In the example of Table I, if a spanish speaking geographic language region was indicated, then Representative 3 would always be chosen, unless the number of pending leads for Representative 3 exceeded 200. If the number of pending leads exceeded 200, then a supervisor or outside contractor could be informed of the lead and/or situation.

TABLE I

Example of Pool of Representatives

| Representative | Language | Manufacturer | Maximun Number Leads |
|---|---|---|---|
| Representative 1 | English | Nortel | 5 |
| Representative 1 | English | Cisco | 10 |
| Representative 1 | English | Any | 10 |
| Representative 2 | English | Cisco | 20 |
| Representative 3 | Spanish | Any | 200 |
| Representative 3 | English | Any | 10 |
| Representative 4 | English | Cisco | 10 |
| Representative 4 | English | Extreme | 10 |

For example, lead information, such as the product line information, the actual product page viewed by the lead, the contact information and the lead's URL, may be used to select a representative and may be delivered to the assigned representative. In one example, the lead information is delivered by way of a contact management system, which may be coupled with the local database.

In another embodiment of the invention, an internet user using a computer enters URL information into an internet browser. By entering the URL information, the user becomes a visitor to a web page that is using the system of this invention. The system identifies the product line or product lines associated with the visitor by identifying pages of the website visited by the visitor. Otherwise, the system may function as previously described.

In yet another embodiment, the system identifies the product line or lines both by parsing out keywords and by tracking the web pages visited.

In one example, the system randomly selects a representative from a group of representatives satisfying the selection criteria.

In another example, the system selects the first representative from a group of representatives satisfying the selection criteria, unless the first representative has exceeded a threshold number of pending leads. For example, representatives may have staggered start times each day, and the order may reflect the first representative having the first start time and so on.

In yet another example, a combination of the foregoing may be used. A group of representatives may start at the same time and may be randomly assigned leads. Alternatively, the lead referral system may be optimized by assigning leads according to an efficiency rating, which may be based on historical records.

FIG. 1 is a flow diagram illustrating a system for automatically assigning a lead to a representative. In one example, the system begins with an internet user accessing a web page hosted by a server using the lead referral system 1. Then, the system obtains the visitor's IP address and tracks the visitor's session including pages visited, duration of visit, referring domain/URL and the keywords used 2, if referred by a search engine. This information may be passed 11 to the next step in the process 3A. The visitor's IP address is compared 3A to IP addresses stored in the database D. If the visitor is a first-time visitor, then the information may be stored 11 in the database D, and then the system directs the process 12 to the next step in the process 3B. If the visitor is a repeat visitor, the system directs the process 10 to the next step in the process 3C. Repeat visitor process 3C determines whether the lead should be assigned to a representative for follow-up. For example, the do not contact flag is checked. A representative is selected 4A based on whether a representative has already been assigned the lead previously, the lead is a pending lead, and/or other criterion, such as product line availability. Thus the lead may be reassigned to a new representative if appropriate and the lead may be removed from the originally assigned representative. Then, the assigned representative is notified 4B of the repeat visitor and the products in which the repeat visitor was interested. This information may be stored 11.

For a first-time visitor, the system determines the IP address using a reverse DNS lookup 3B and translates the IP address to a domain name 5, adding the domain name 11 to the local database D. The system filters the domain names 6, parsing the domain names of non-corporate and ISP domains. This information is stored 14, 11 in the local database D, and domain names that are determined to be leads for follow-up by a representative are passed to the next step in the process 7 to determine the registrar and to retrieve the contact information for the domain name from the registrar's database. For example, only domain names of public companies may be chosen for follow-up, or certain domain names, such as ISP's used not by companies but by individuals, may be excluded from follow-up. Then, the system assigns the lead to representatives 8 from a pool of representatives based on criteria, such as product line, language and availability.

The system records 11 the contact information and representative selected in database D. Finally, information is passed to a contact management system 9, which provides a system for representatives to follow-up on as leads.

In one example, the process of retrieving information from the registrar database 7 uses rules, such as for black-out times, for each registrar as shown in Table II. For example, the time of the last contact with each of the registrar databases or the elapsed time may be used to schedule queries to the various registrar databases.

In one example, the system may need to determine the contact information for more than one visitor from a single registrar's database server. The system may submit the first request to the registrar's database server and record the time of the request in a database. Then, the system checks the database prior to contacting the registrar and compares the elapsed time with the black-out time to determine when the next request should be scheduled. The system will wait before submitting the second request until the black-out time has passed. Meanwhile, a request to a different registrar database for a lead associated with a different domain name may be processed by the server, or the server may otherwise process leads.

TABLE II

Examples of Allowable Frequency of Registrar Database Retrieval Request Submissions

| Registrar Domain | Registrar | Country | Black-Out Time in Seconds |
| --- | --- | --- | --- |
| whois.alabanza.com | Alabanza, Inc. | US | 60 |
| whois.nic.de | Deutsches Info Network | DE | 60 |
| whois.enom.com | eNom, Inc. | US | 120 |
| cc.fsu.edu | Florida State University | US | 60 |
| whois.ibm.com | IBM | US | 300 |
| whois.nrl.navy.mil | Naval Research Labratory | US | 60 |
| whois.networksolutions.com | Network Solutions, Inc. | US | 120 |
| whois.nsiregistry.net | Network Solutions, Inc | US | 60 |
| www.nic.mx | NIC-Mexico | MX | 60 |
| whois.nic.uk | Nominet UK | GB | 60 |

There are actually at least 140 different registrars, each with there own designated rules, such as about their black-out time. These change periodically, and the database is updated to reflect these changes. The black-out times may be determined on a trial and error basis for each of the registrars, for example.

Figure 2:
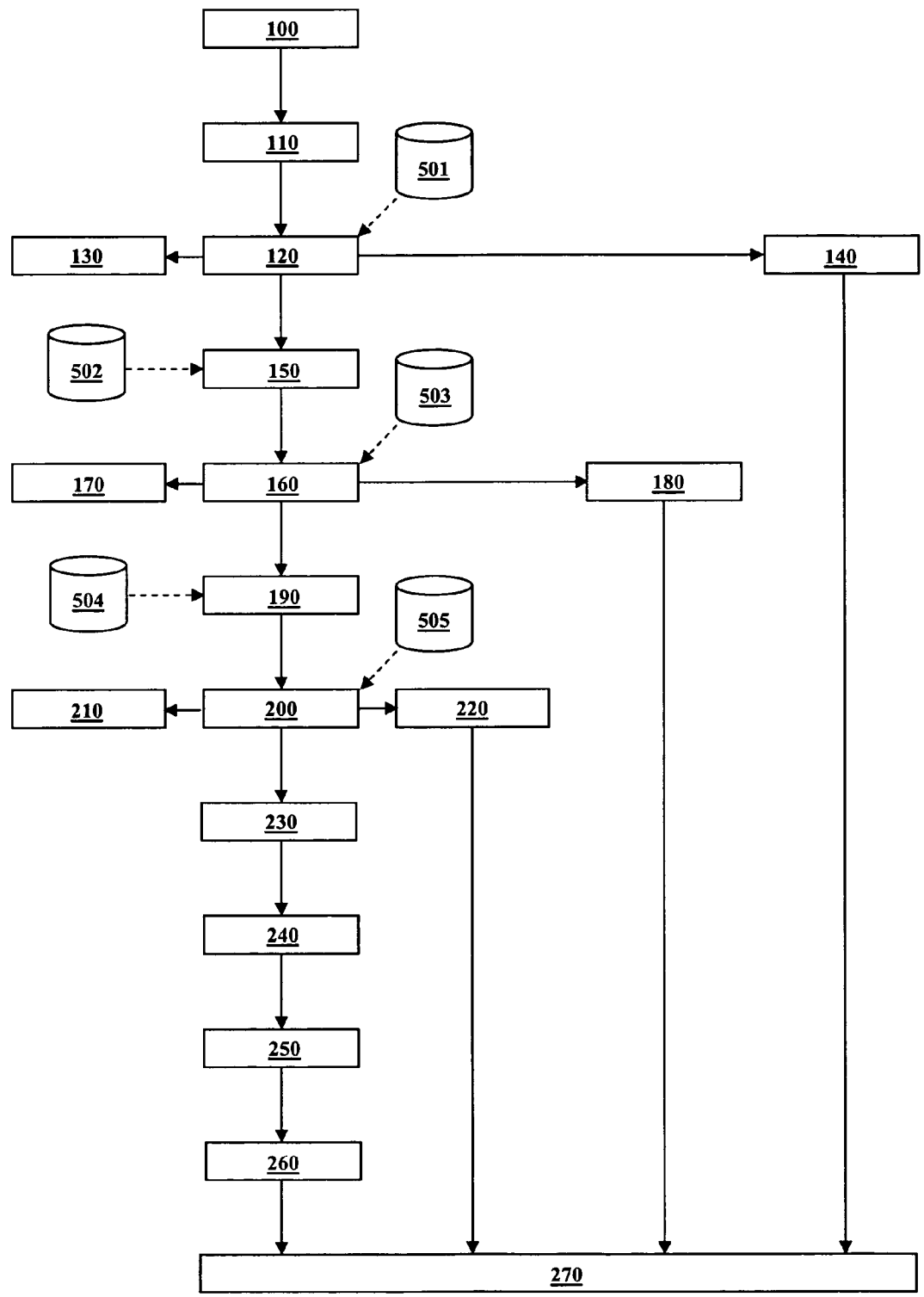
FIG. 2 illustrates another example of a system flow diagram of the present invention.

FIG. 2 is a flow diagram illustrating a system for automatically assigning a lead to a representative. In one example, the system begins with an internet visitor accessing a web page hosted by a server using the lead referral system 100. The system obtains 110 an IP address for the visitor and identifies 110 a product line associated with the visitor either by parsing out one or more keywords from the URL of the referring search engine, provided the visitor accessed the web page via a search engine, or from the a product line identifier associated with the web page or pages visited.

A local database 501, having records indexed by IP address, stores information, such as contact information, URL of the visiting company, identifier for the representative who was previously assigned to the visitor and a flag indicating whether or not a representative should follow-up on this lead by contacting the visitor. The system searches 120 the database 501 for an IP address matching the visitor's IP address. If a match is found, the system checks 120 the flag indicating whether the visitor should be contacted. If the visitor should not be contacted, processing on this lead ends 130. If the visitor should be contacted, lead information, such as the product line, the contact information, the URL of the visiting company, and the identifier for the representative, passes 140 to the contact management system 270. If a match of the visitor's IP address is not found in the database 501, a reverse DNS lookup 150 may be made against an external database 502 to obtain a domain name associated with the visitor's IP address.

A local database 503, having records indexed by domain name, stores information, such as contact information, URL of the visiting company, identifier for the representative who was previously assigned to the visitor and a flag indicating whether or not a representative should follow-up on this lead by contacting the visitor. The system searches 160 the database 503 for a domain name matching the visitor's domain name. If a match is found, the system checks 160 the flag indicating whether the visitor should be contacted. If the visitor should not be contacted, processing on this lead ends 170. If the visitor should be contacted, lead information, such as the product line, the contact information, the URL of the visiting company, and the identifier for the representative, passes 180 to the contact management system 270. If a match of the visitor's domain name is not found in the database 503, a lookup 190 may be made against an external registrar database 504 to obtain contact information associated with the visitor's domain name.

A local database 505, having records indexed by company name, stores information, such as contact information, URL of the visiting company, identifier for the representative who was previously assigned to the visitor and a flag indicating whether or not a representative should follow-up on this lead by contacting the visitor. The system searches 200 the database 505 for a company name matching the visitor's company name. If a match is found, the system checks 200 the flag indicating whether the visitor should be contacted. If the visitor should not be contacted, processing on this lead ends 210. If the visitor should be contacted, lead information, such as the product line, the contact information, the URL of the visiting company, and the identifier for the representative, passes 220 to the contact management system 270. If a match of the visitor's company name is not found in the database 505, the visitor is a first-time visitor.

For a first-time visitor, the system determines 230 the geographic language region for the visitor, such as english or spanish. Next, the system selects 240 a representative to follow up on the lead by contacting the visitor. The system may select the representative from a pool of representatives having experience with the product line, having language skills matching the visitors language region, and having capacity to accept new leads. Then, the system creates 250 a URL data string for the visiting company. The system inserts 260 into the local databases 501, 503, and 505 the visitor information, such as the contact information, the company name, the domain name, the IP address, the URL data string of the visiting company, and the identifier for the selected representative. Finally, the system passes 260 to the contact management system the lead information for the first-time visitor, such as the product line, the contact information, the URL data string for the visiting company, and the identifier for the selected representative.

What is claimed is:

1. A system for assigning a lead to a representative, comprising:
   hosting a web page on a server, the web page containing information about a product line;
   using a network address obtained upon access by the user of a search engine to the web page hosted by the server to generate the lead;
   identifying the product line and associating the product line with the lead;
   obtaining information about the lead from an external database; and
   selecting a representative for receiving the information about the lead and the product line, based on the information obtained about the lead from the external database and the information about the product line contained on the web page hosted by the server, such that the system delivers the lead to one of the representatives having experience with the product line associated with the lead.

2. The system of claim 1, wherein the step of identifying the product line associated with the lead uses at least one keyword from a URL, provided by a referring search engine using the internet.

3. The system of claim 1, wherein the step of identifying the product line associated with the lead uses information provided by the server about the web page hosted by the server and accessed by the lead.

4. The system of claim 3, wherein the step of identifying further comprises using a least one key word from a URL supplied by the referring search engine.

5. The system of claim 1, further comprising storing the network address and contact information for the lead in a local database.

6. The system of claim 5, wherein an element stored in the local database indicates whether the lead should be contacted.

7. The system of claim 6, further comprising checking the lead against existing leads stored in the local database and handling the lead as an exception if the network address of the lead matches a network address of one of the existing leads stored in the local database.

8. The system of claim 7, further comprising obtaining the contact information stored in the local database, if the network address of the lead matches a network address of one of the existing leads.

9. The system of claim 1, further comprising determining a domain name based on the network address.

10. The system of claim 9, wherein the step of obtaining information uses the domain name to obtain contact information for the lead from the external database over the internet.

11. The system of claim 10, further comprising storing the contact information in the local database.

12. The system of claim 11, wherein an element stored in the local database indicates whether the lead should be contacted.

13. The system of claim 12, further comprising checking the lead against existing leads stored in the local database and handling the lead as an exception if the contact information of the lead matches contact information of one of the existing leads stored in the local database.

14. The system of claim 13, further comprising determining the geographic language region based on the contact information if the contact information of the lead does not match contact information of one of the existing leads stored in the local database.

15. The system of claim 14, wherein the representative selected by the system is a representative having language skills matching the geographic region for the lead.

16. The system of claim 15, further comprising the system parsing a URL associated with the lead based on the contact information.

17. The system of claim 10, wherein the step of obtaining information comprises accessing a registrar database.

18. The system of claim 17, wherein the step of obtaining information further comprises checking a database having information about black-out times for a registrar database to be accessed and scheduling access to avoid the black-out times.

19. The system of claim 1, further comprising determining the geographic language region based on the contact information.

20. The system of claim 19, wherein the representative selected by the system is a representative having language skills matching the geographic region for the lead.

21. The system of claim 20, further comprising parsing a URL associated with the lead based on the contact information.

22. The system of claim 1, wherein the representative selected by the system is the same as a previously selected representative, when the system determines that the lead is the same lead as one previously assigned to the representative.

23. The system of claim 1, further comprising the system storing the rules for a plurality of external databases in a database.

24. A system for assigning a lead, according to claim 1, further comprising:

obtaining information about the lead from the external database using a server to access the external database having black-out times;

determining the black-out time for the external database; and scheduling retrieval of information from the external database to avoid the black-out times.

25. The system of claim 24, further comprising the system storing the black-out times for a plurality of external databases in a database.

26. The system of claim 25, wherein the step of scheduling continues other processes until the black-out time from the last request to the same external database has lapsed, before proceeding with a subsequent step of obtaining information is processed by the system for the same external database.

27. The system of claim 26, wherein the other processes include the system obtaining information from a different external database for a different lead.

28. The system of claim 24, further comprising the system using a different server to obtain information about the lead from the external database having black-out times than the server used in the step of obtaining in claim 24.

* * * * *